United States Patent [19]

Eshraghian

[11] 3,824,480

[45] July 16, 1974

[54] SEQUENTIAL SWITCHING DEVICE

[75] Inventor: Kamran Eshraghian, Hillcrest, Australia

[73] Assignee: U.S. Philips Corporation, New York, N.Y.

[22] Filed: Nov. 29, 1972

[21] Appl. No.: 310,233

[30] Foreign Application Priority Data

Nov. 29, 1971 Australia .............................. 7204/71

[52] U.S. Cl. ........................ 328/75, 328/37, 328/130

[51] Int. Cl. ........................................... H03k 17/28

[58] Field of Search ............. 328/37, 72, 73, 74, 75, 328/129, 130

[56] References Cited

UNITED STATES PATENTS

| | | | |
|---|---|---|---|
| 2,975,338 | 3/1961 | Bivens et al. | 328/130 X |
| 3,093,796 | 6/1963 | Westerfield | 328/37 X |
| 3,638,189 | 1/1972 | Gamache | 328/75 X |
| 3,688,200 | 8/1972 | Miki | 328/75 X |
| 3,747,000 | 7/1973 | McIver | 328/75 |

*Primary Examiner*—John S. Heyman
*Attorney, Agent, or Firm*—Frank R. Trifari

[57] ABSTRACT

A switching device is disclosed in which switch control means (a multi-stage shift register) controls the switching of switching elements which, in turn, control a predetermined sequence of operations of a controlled device (for example, a washing machine) in a predetermined sequence of times. Stepping pulse generating means steps the switch control means stage by stage. The timing of the stepping pulses is controlled by a periodic pulse generating means via a gated control means in turn controlled by a counter and the outputs of the switch control means.

7 Claims, 2 Drawing Figures

SEQUENTIAL SWITCHING DEVICE

The present invention relates to switching devices of the kind comprising a plurality of control points, each point of the plurality being associated with a combination of one or more switching elements whereby the switching elements for each combination are adapted to be actuated by the presence of actuation information at the control point associated therewith. The control points are the outputs of a shift register under the control of stepping pulses which advance the state of the register whereby a series of combinations of switching functions are performed, the intervals between occurrence of consecutive stepping pulses determining the period of time for which actuation information is present at the respective control points.

Such devices are employed, inter alia, for the control of switching operations in a washing machine.

The present invention seeks to improve upon the known devices. According to the invention, the stepping pulses are derived from a source which relies upon trigger information supplied from a selected stage of a multi-stage counter via a gating means. A clock (periodic) pulse generator drives the multi-stage counter so that individual counter stages produce trigger information at different time intervals after initiation of the clock pulse generator, the clock pulse generator being arranged to be initiated in response to the actuation information present at one or more of the respective control points, which also control the gating means.

It is not necessary for the multi-stage counter to be the sole means from which triggering information may be derived. For instance, the stepping pulse source may additionally be adapted to deliver a stepping pulse upon closure of a manually operated switch or upon applications of trigger information from a source other than a stage of the multi-stage counter.

Manually operated selection means may permit manual selection of the stage of the multi-stage counter relied upon for the supply of the said trigger information.

The invention will now be described with reference to the accompanying drawings in which.

Figure 1:
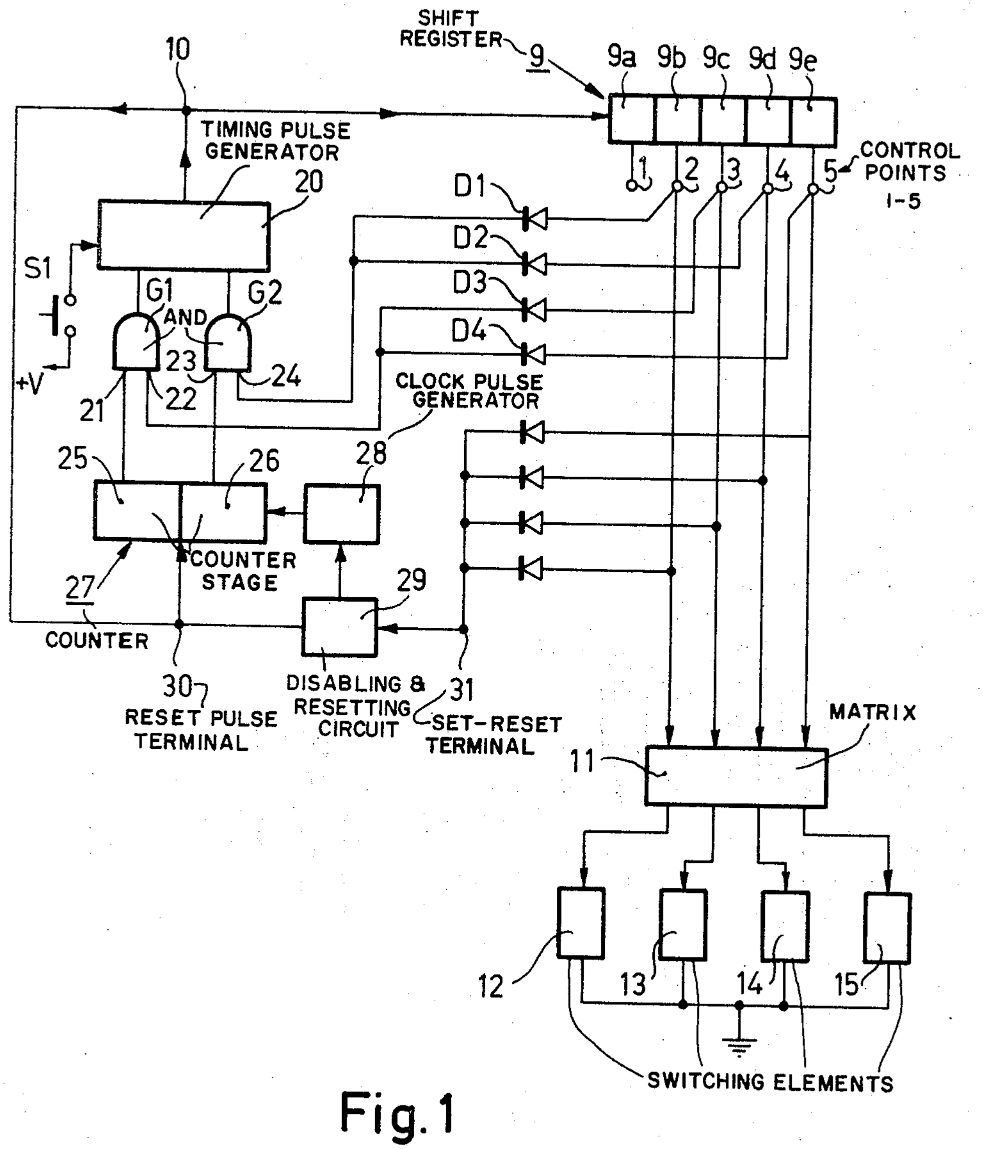
FIG. 1 is a schematic diagram of a switching device in accordance with the present invention and suitable for controlling the switching operations of an automatic washing machine.

In FIG. 1, the control points 1, 2, 3, 4 and 5 are each connected to the output of a stage of the shift register 9 having stages 9*a*, 9*b*, 9*c* etc., control point 1 being connected to the output of stage 9*a*, control point 2 being connected to the output stage 9*b* etc. The shift register 9 is driven by timing pulses supplied via the terminal 10. The shift register 9 is of known kind and operates in a known manner. In an initial state, the control point 1 is in the "high" state with the remaining control points all at the "low" state. The terms high and low indicate, in the present instance, a predetermined positive voltage level and a zero voltage level respectively.

At the occurrence of the first timing pulse applied via the terminal 10, the shift register 9 is advanced so that the control point 2 goes to the high state, the control point 1 goes to the low state and terminals 3 to 5 remain in the low state. This condition remains until the occurrence of the next timing pulse whereupon the control point 3 goes to the high state and control point 2 returns to the low state, control point 1 and control points 4 and 5 remain in the low state. The process is continued with the high state being transferred sequentially along the plurality of control points 1 to 5 at the occurrence of successive timing pulses. When the control point 5 is at the high state, the next succeeding timing pulse results in the shift register 9 being returned to its initial state.

The control points 2 to 5 are connected via the matrix 11 to the switching elements 12, 13, 14 and 15. The switching elements 12, 13, 14 and 15 are each in the form of a transistor provided with a load in its collector circuit. The load may be in the form of a relay, a motor, a resistance etc. The connections from the control points 2 to 5 to the switching elements 12, 13, 14 and 15 are such that each of the control points 2 to 5 is associated with a combination of one or more of the switching elements 12 to 15. Each control point is connected to the base electrodes of the transistors of the switching elements associated therewith.

Accordingly, if a particular control point is in the high state then the base electrodes of the transistors of the switching elements with which that particular control point is associated will also be in the high state and if the particular terminal is in the low state, then the base electrodes of the transistors of the switching elements with which that terminal is associated will also be in the low state. The transistors of the switching elements are arranged so that each transistor is cut off when its base electrode is at the low state and is conducting when its base electrode is at the high state. Thus, the switching elements 12 to 15 may be regarded as being actuated when the base electrode of their respective transistors is in the high state and the information provided by the control points 2 to 5 being in either the high or the low state may be regarded as actuating information. The emitter electrodes of the transistors of the respective switching elements 12 to 15 are connected to earth.

Timing pulses for advancing the states of the shift register 9 are supplied to the terminal 10 from the timing pulse generator 20 which is arranged to produce a single timing pulse whenever trigger information is supplied from either the start switch S1 or from one of the outputs of the "and" gates G1 and G2.

The input 21 of the gate G1 is connected to an output of stage 25 of the two stage counter 27 and the input 23 of the gate G2 is connected to an output of stage 26 of the counter 27. The counter 27 is driven by clocking pulses supplied from the clock pulse generator 28 which may be generally similar to the oscillator 28 in FIG. 1 of the applicant's copending Australian Patent Application No. 48775/72. There is a disabling and resetting circuit 29 associated with the generator 28 which may be generally similar to the circuit associated with the transistor 26 in FIG. 1 of the applicant's aforementioned co-pending Australian Patent Application. The generator 28 is a relaxation oscillator having a period of 1 minute i.e. at one minute intervals after the initiation of a period of oscillation, the oscillator produces a positive going pulse of short duration. The generator 28 may be reset or disabled by the application of a positive going pulse to the terminal 30 or by the terminal 31 being placed in the low state. The disabling of the generator 28 may be lifted by the terminal 31 being placed in the high state.

When the generator 28 is producing pulses at 1 minute intervals, the counter 27 is clocked at 1 minute intervals so that starting from an initial state of the counter 27 at which the output of both stages 25 and 26 are at the low state, the output of the stage 26 goes to the high state after 1 minute from initiation of the generator 28 and the output of the stage 25 goes to the high state two minutes from initiation of the generator 28. The counter 27 may be reset to the initial state by application of a positive going pulse to the terminal 30. The input 24 of the gate G1 is connected via the diodes D1 and D2 to the control points 2 and 4 respectively. The input 22 is connected via the diodes D3 and D4 to the control points 3 and 5 respectively.

The operation of the circuit of FIG. 1 is as follows. With power supplied to the apparatus, the shift register 9 (which functions as a switch control means) is in the initial state with the control point 1 in the high state and the clock pulse generator 28 (which functions as a periodic pulse generating means) is in a disabled state. If now the start switch S1 is depressed, the timing pulse generator 20 (which functions as a stepping pulse generating means) produces a single timing pulse which steps or triggers the shift register 9 into its second state so that the control point 2 comes high. With the control point 2 high, the switch elements 12 to 15 associated with the control point 2 and actuated and, in addition, the disabling of the generator 28 is lifted so that it commences a cycle of oscillation. At the end of one minute, the input 23 of the gate G2 becomes high as a result of the change of state of the stage 26 of the counter 27 (which with gates G1 and G2 functions as gated control means) and since the input 24 of the gate G2 is also high due to the control point 2 being high, trigger information is supplied from the output of the gate G2 to the generator 20 causing the generator 20 to produce another single timing pulse which is fed to the shift register 9 triggering the latter into its third state and which is also fed to the terminal 30 resetting both the counter 27 to its initial state and resetting the generator 28 to its initial state also.

In the third state of the register 9, the control point 3 is high so that the disabling of the generator 28 is lifted from the commencement of the third state. At the end of one minute from the initiation of the generator 28, the state of the stage 26 of the counter 27 again changes but since both of the control points 2 and 4 are in the low state the input 24 of the gate G2 is also in the low state and no trigger information can be transferred to the generator 20 from the stage 26. However, at the end of 2 minutes from the initiation of the generator 28, the stage 25 of the counter 27 changes state making the input 21 of the gate G1 high. Since now the input 22 of the gate G1 is also high, the output of the gate G1 goes high thereby triggering the generator 20 into producing a further timing pulse triggering the shift register 9 into the fourth state and simultaneously resetting the counter 27 and the generator 28 into their initial states.

The pattern of operation associated with the fourth state of the register 9 follows a similar pattern as the second state and the pattern of operations associated with the fifth state follows a similar pattern as the third state. At the termination of the fifth state, the register 9 is restored to its initial state.

It will be appreciated that as the register 9 goes respectively through the second, third, fourth and fifth states, the switching elements associated with the control points 2, 3, 4 and 5 are either actuated or not actuated depending upon whether the particular control point is in the high state or in the low state during a particular state. Accordingly, in the initial state of the register 9, none of the elements 12 to 15 are actuated. In the second state, the switching elements 12 to 15 associated with the control point 2 are actuated for a period of 1 minute. In the third state, the switching elements 12 to 15 associated with the control point 3 are actuated for a period of 2 minutes. In the fourth state, the switching elements 12 to 15 associated with the control point 4 are actuated for a period of 1 minute and in the fifth state, the switching elements associated with the control point 5 are actuated for a period of 2 minutes.

Figure 2:
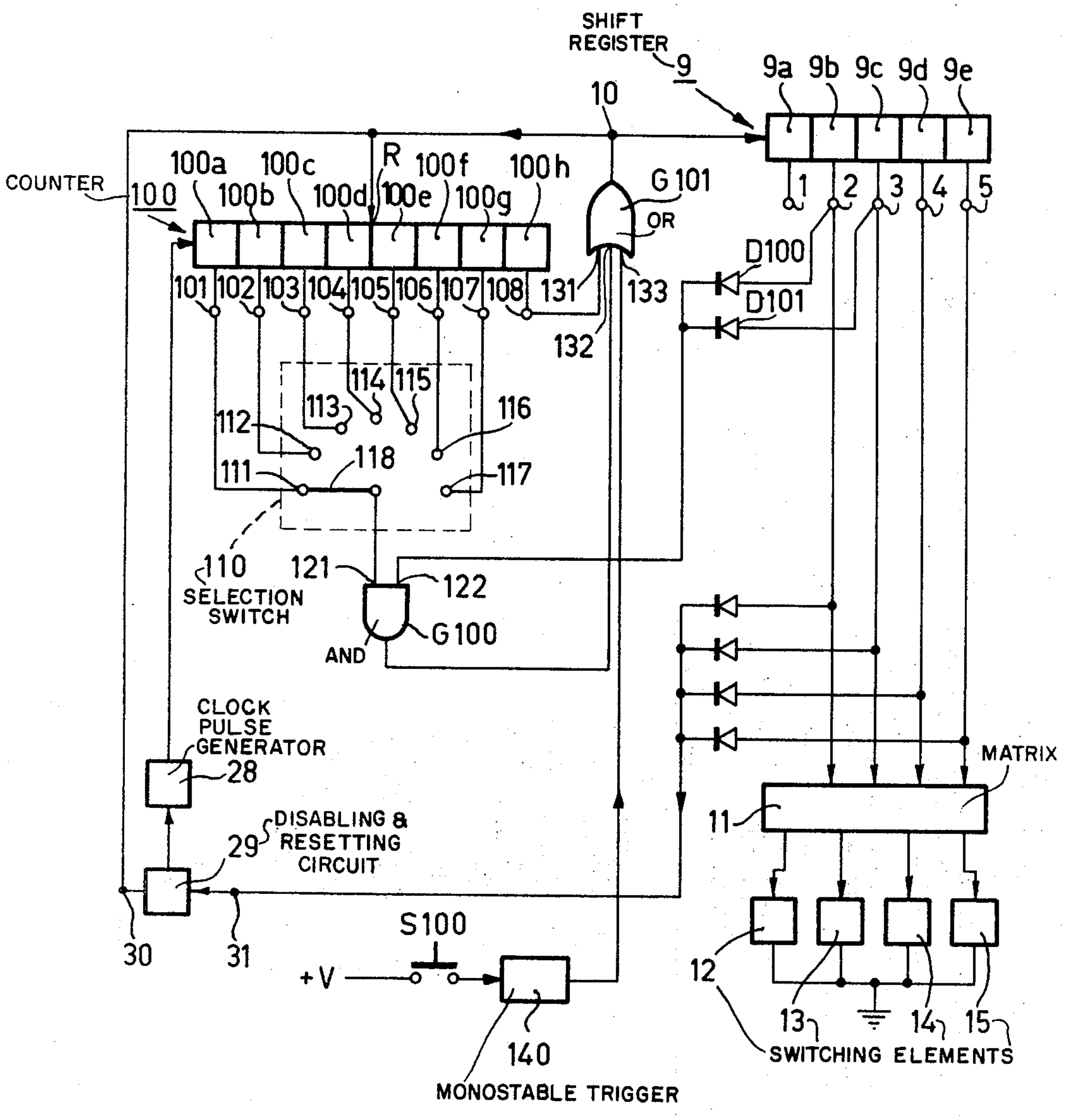
FIG. 2 is a schematic diagram of another switching device in accordance with the present invention also suitable for controlling the switching operations of an automatic washing machine.

In FIG. 2, which illustrates the circuit of a switching device provided with selection means arranged to be controlled by the presence or absence of actuation information at one or more of the respective control points and in which trigger information is supplied from certain individual counter stages, many parts are identical with corresponding parts of FIG. 1 and like parts are denoted by like numerals or letters.

The chief difference between the device of FIG. 1 and that of FIG. 2 is that the counter 27 of FIG. 1 and the selection means constituted by the gates G1 and G2 acting in association with the timing pulse generator 20 also of FIG. 1 are replaced in FIG. 2 by the eight-stage counter 100 having stages **100*a* to 100*h*, the selection means constituted by the "and" gate G100 associated with the "or" gate G101, the selection switch 110 provided between the counter 100 and the gate G100, and the monostable trigger circuit 140 which is associated with the push-button operated start switch S100. An additional difference is that the generator 28 of FIG. 2, although similar to the generator 28 of FIG. 1 otherwise, has a period of thirty seconds i.e. at thirty second intervals after the initiation of the generator, the generator produces a positive going pulse of short duration. The generator 28 of FIG. 2 drives the counter 100 in a manner similar to that in which the generator 28 of FIG. 1 drives the counter 27 and accordingly when the generator 28 is producing pulses at thirty second intervals, the counter 100 is clocked at thirty second intervals so that, assuming temporarily that the reset terminal R of the counter 100 is disconnected, and starting from an initial state of the counter 100 at which the output terminals 101–108 are all at the low state, the output terminal 101 of the stage 100*a* goes to the high state after thirty seconds from initiation of the generator 28, the output terminal 102 of the stage 100*b* goes to the high state after 1 minute etc., the output terminal 108 of stage 100*h* going to the high state four minutes from initiation of the generator 28. However, the counter 100** is reset to the initial state when the terminal R goes high.

The output terminals 101–107 of the counter 100 are connected respectively to the terminals 101–107 of the manually operated selection switch 110, the selector arm 118 of which is connected to the input 121 of the "and" gate G100 thus permitting connection of any single one of the output terminals 101–107 to be connected to the input 121 according to the selected position of the switch 110.

The other input 122 of the gate G100 is connected via the diodes D100 and D101 to the control points 2 and 3 of the shift register 9 respectively. The output of the "and" gate G100 is connected to the input 132 of the "or" gate G101. The output terminal 108 of the counter 100 is connected to another input 131 of the "or" gate G101 whereas the third input 133 of the "or" gate G101 is connected to the output of the monostable trigger 140 which produces a single positive going pulse of short duration each time the spring loaded push-button start switch S100 is actuated.

The operation of the circuit of FIG. 2 is as follows. With power applied to the apparatus, the shift register 9 is in the initial state with the control point 1 in the high state and the generator 28 is in the disabled state. If now the start switch S100 is depressed, the monostable trigger 140 (which functions as a stepping pulse generating means) produces a single timing pulse which steps or triggers the shift register 9 into its second state so that the control point 2 becomes high. With the control point 2 high, the switch elements 12 to 15 associated with the control point 2 are actuated and, in addition, the disabling of the generator 28 is lifted so that it commences a cycle of oscillation. At the end of 30 seconds, the output 101 of the counter 100 (which with gate G100 functions as gated control means) becomes high and, if the arm 118 of the selector switch 110 is set for contact with the terminal 111, as illustrated, then, since the control point 2 is high, the output of the gate G100 produces trigger information by going high. The high at the output of the gate G100 is fed to the terminal 10 via the "or" gate G101 triggering the shift register 9 into its third state and also resetting the counter 100 to its initial state and disabling the generator 28. Of course, as soon as the counter 100 is reset to its initial state, the output of the gate G100 and the terminal 10 become low.

In the third state of the shift register 9, the control point 3 is high so that the disabling of the generator 28 is lifted from the commencement of the third state and the pattern of operation associated with the second state is repeated except that the switch elements 12–15 associated with the control point 3 are actuated instead of those associated with the control point 2. At the end of the third state, the shift register 9 is triggered into the fourth state, the counter 100 is reset to its initial state and the generator 28 disabled by the timing pulse produced at the terminal 100 as a result of the output of the gate G100 going high.

In the fourth state of the shift register 9, the gate G100 is closed since the input 122 is low. As a result, the generator 28 continues producing pulses at thirty second intervals which clock the counter 100 and at the end of four minutes the output terminal 108 goes high supplying a high to the input 131 of the "or" gate G101 which is conveyed to the terminal 10 triggering the shift register 9 into the fifth state, resetting the counter 100 and disabling the generator 28. Of course, during the fourth state, the switching elements 12–15 associated with the control point 4 are actuated.

In the fifth state of the shift register 9, the control point 5 is high and the pattern of operation associated with the fourth state is repeated except that the switching elements 12–15 associated with the control point 5 are actuated. At the end of the fifth state, the shift register 9 is triggered into its initial state once more by the timing pulse produced at the terminal 10 as a result of the terminal 108 becoming high whereupon the shift register 9 is arrested since the generator 28 is disabled until the start switch S100 is depressed once more.

It will readily be understood that by adjustment of the selector arm 118 of the selector switch 110 the duration of the second and third states may be altered from the thirty second period described to be 1, 1½, 2, 2½, 3 or 3½ minutes in duration. Accordingly, selection of the particular state 100*a*–100*h* relied upon for the supply of trigger information is controlled not only by the presence or absence of actuation information at the control points 2–5, thus being determined by the state occupied by the shift register 9, but is also determined by the switch 110.

A relatively simple modification to the embodiment described in relation to FIG. 2 is the connection of the output terminal 108 via the switch 110 instead of to the input of the "or" gate 131 and the simultaneous connection of the control points 4 and 5 respectively via diodes to the terminal 122. Such a modification results in completely manual selection of the stage of the counter 100 relied upon for the supply of the trigger information.

Another modification to the embodiment described in relation to FIG. 2 is the replacement of the generator 28 by a clock pulse generator having two modes of operation, the intervals between clock pulses being relatively lengthy (e.g. 30 seconds) in one mode and being relatively short (e.g. 5 milliseconds) in the other mode. Such a generator is generally described and illustrated as oscillator 128 in the Applicant's co-pending Australian Patent Application No. 48802/72. With such a modification, it is possible to achieve variations of the series of switching functions or programs carried out by the device if the mode of operation of the oscillator 28 is determined for different states of the shift register 9 by the actuation information at the control points 2–5, rapid advancement of the shift register 9 through selected states under the control of a program selection means being possible in the same general manner as rapid advancement is achieved in the apparatus described in the Australian Patent Application No. 48802/72. Provision for inhibition of the switching elements 12–15 or for counteracting the effects thereof during the rapid advancement of the shift register 9 may be made by following the principles outlined in the Australian Application No. 48802/72.

Of course, corresponding modifications to the device of FIG. 1 may be made to achieve program variation by rapid advancement of the shift register 9, if desired also with means for the inhibition of the switching elements 12–15 or for counteracting the effects thereof during rapid advancement of the shift register 9.

Many other modifications or variations of the embodiments of the invention described in relation to FIG. 1 and FIG. 2 are possible. For instance, the shift register 9 may be provided with many more stages for controlling many more combinations of switching elements. The generator 20 and the counter 27 of FIG. 1, and the generator 28 and the switching elements 12 to 15 of either Figure, may be provided in any form appropriate for carrying out the invention. If desired, the diodes D1, D2, D3 and D4 of FIG. 1 or the diodes D100 and D101 of FIG. 2 may be replaced by a switching matrix which enables programs to be selected in relation to the series of combinations required.

Such modifications and/or variations are intended to be included within the scope of the present invention.

What is claimed is:

1. A switching device for controlling a plurality of operations in a predetermined sequence of operations and at predetermined times, said switching device comprising:

A. a plurality of switching elements for controlling selected operations;

B. switch control means having a plurality of stages, each stage having an activatable control output connected to predetermined ones of said switching elements for controlling said switching elements;

C. stepping pulse generating means for stepping said switch control means from one stage to another;

D. periodic pulse generating means responsive to an activated control output of said switch control means for generating a sequence of pulses each separated by a predetermined period; and E. gated control means coupled to preselected ones of the control outputs of said switch control means and to said periodic pulse generating means and responsive to predetermined periodic pulses for stepping said switch control means from stage to stage and thereby activating said switching elements to control operations of said predetermined sequence of operations in accordance with the timing of the periodic pulses.

2. A switching device according to claim 1 wherein said gated control means comprises a multi-stage counter responsive to the periodic pulses to activate predetermined counter stages, and gating means responsive to an activated control output of said switch control means and an activated counter stage for stepping said switch control means to the next stage.

3. A switching device according to claim 2 wherein said gating means comprises a plurality of "and" gates each responsive to a preselected activated counter stage and an activated control output to cause said stepping pulse generating means to step said switch control means.

4. A switching device according to claim 3 wherein said gating means comprises an "and" gate responsive to a selected stage of said multi-stage counter to step said switch control means when said selected stage is activated.

5. A switching device according to claim 4 wherein said gating means further includes a selection switch to connect an input of said "and" gate with a selected one of the outputs of said multi-stage counter.

6. A switching device according to claim 5 wherein said periodic pulse generating means has two modes of operation for generating pulses spaced by two different preselected periods.

7. A switching device according to claim 6 wherein said plurality of switching elements controls the operations of a washing machine.

* * * * *